(No Model.) 2 Sheets—Sheet 1.
J. D. CULP.
DEMONSTRATIVE ELECTRICAL APPARATUS.
No. 311,725. Patented Feb. 3, 1885.
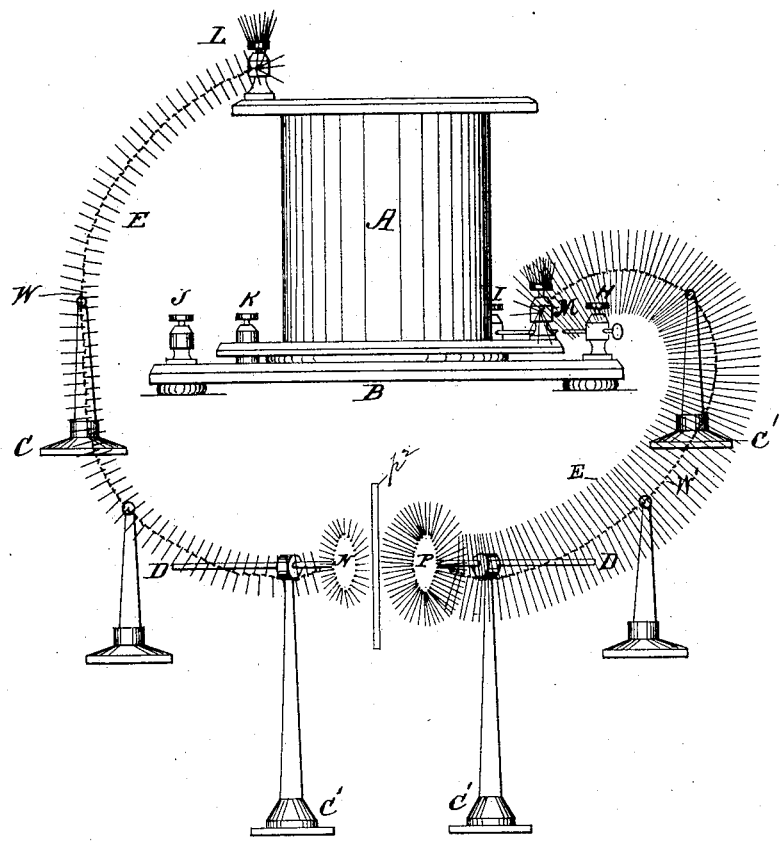
WITNESSES:
W. W. Hollingsworth
Edw. W. Byrn.
INVENTOR:
J. D. Culp
BY Munn & Co
ATTORNEYS.

(No Model.) 2 Sheets—Sheet 2.
J. D. CULP.
DEMONSTRATIVE ELECTRICAL APPARATUS.
No. 311,725. Patented Feb. 3, 1885.
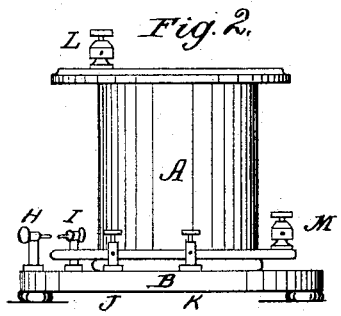
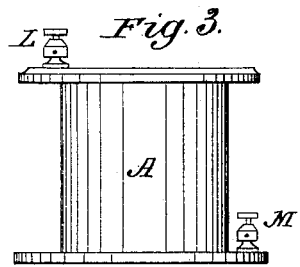
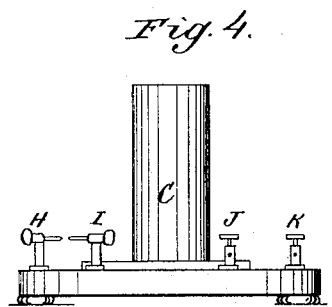
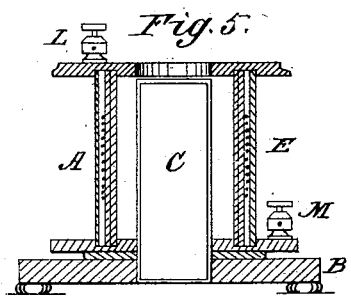
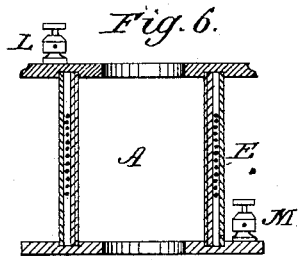
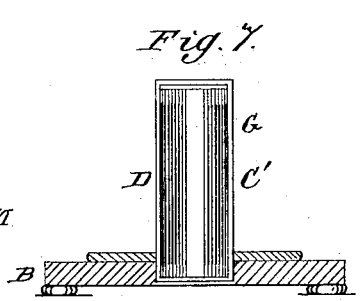
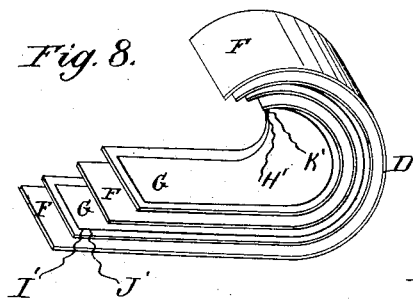
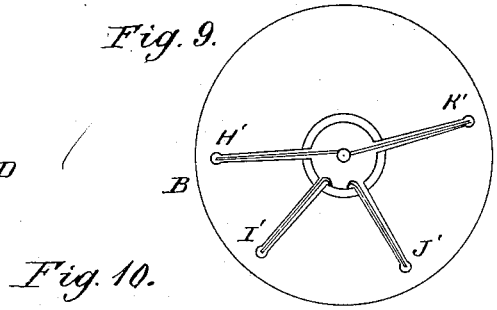
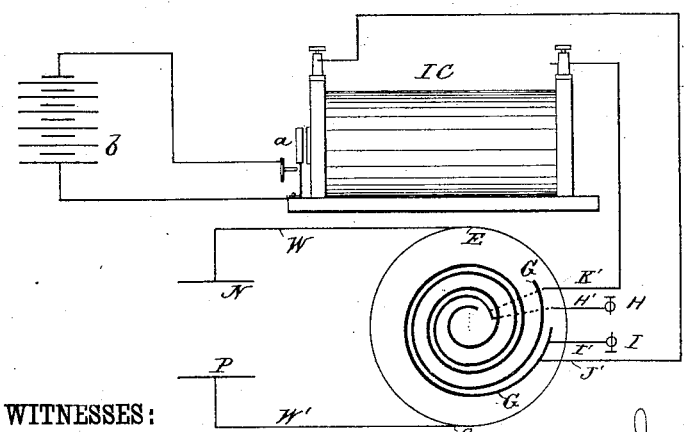
WITNESSES:
W. W. Hollingsworth
Edw. T. Byrn
INVENTOR:
J. D. Culp
BY Munn & Co.
ATTORNEYS.

UNITED STATES PATENT OFFICE.

JAMES DARIUS CULP, OF SAN FELIPE, CALIFORNIA.

DEMONSTRATIVE ELECTRICAL APPARATUS.

SPECIFICATION forming part of Letters Patent No. 311,725, dated February 3, 1885.

Application filed July 7, 1883. Renewed April 10, 1884. (No model.)

*To all whom it may concern:*

Be it known that I, JAMES DARIUS CULP, of San Felipe, in the county of Santa Clara and State of California, have invented a new and useful Improvement in Demonstrative Electrical Apparatus; and I do hereby declare that the following is a full, clear, and exact description of the same, reference being had to the accompanying drawings, and to the letters of reference marked thereon, making a part of this specification, in which—

Figure 1 is a side elevation of my apparatus with connecting-wires supported upon insulating-stands. Figs. 2 and 5 are respectively a side elevation and a vertical section of the principal part of the apparatus. Figs. 3 and 6 are respectively a side elevation and a vertical section of the outer casing of the apparatus. Figs. 4 and 7 are corresponding views of the base and inner coil of the apparatus. Fig. 8 is a perspective view showing the manner of forming the inner coil of alternate layers of tin-foil and hard rubber. Fig. 9 is an underneath view of the base of the instrument, and Fig. 10 is a view of my invention shown diagrammatically in connection with an induction-coil and a battery.

My invention consists of new electrical apparatus and devices for accumulating and discharging electricity, and in exhibiting a new electrical phenomena, and especially, among other things, in producing electric discharges which are visible to the naked eye, and by means of which new apparatus said discharges can be made to pass in plain view into and through that class of substances called "dielectrics," such as glass, shellac, and vulcanized rubber.

In Fig. 1 of the drawings the principal part of my apparatus, which I call an "accumulator," is shown in connection with the wires connected to two metallic disks. In this figure, C' are insulating-stands, which support the wire. A is an external view in elevation of my accumulator. N and P are two metallic terminal disks supported upon the ends of rods D D, which pass loosely through the upper ends of two insulating-stands. The respective wires W W', one of which extends from the binding-post L to the disk N, while the other extends from the binding-post M to the disk P, convey electrical currents. The radial lines E, projecting from the wires W W', are intended to represent the idea of the usual electrical discharges as it is brought to view by my apparatus, as will be hereinafter more fully explained.

My accumulator is constructed in two principal parts, which I will now describe.

F F in Fig. 8 are sheets of hard rubber, which may be fifteen inches wide by one hundred and twenty inches long. G G are layers of tin-foil cut smaller than the hard-rubber sheets, and are placed alternately between hard-rubber sheets in such manner that the two layers of the tin-foil are entirely separated from each other by the hard-rubber sheets. These layers of hard rubber may consist of one sheet or several. The layers of hard rubber and tin-foil are then rolled into a compact bundle, which is placed in a cylindrical hard-rubber case, (marked C in the drawings, Figs. 4, 5, and 7.) The hard-rubber sheets and the tin-foil layers, being thus rolled into a bundle, form coils in alternate layers. A sectional elevation of this bundle of hard-rubber sheets and alternating tin-foil layers inclosed in the hard-rubber case C is shown in Fig. 7. The lower end of the case C is secured in an insulated platform of wood or any other suitable material. I also construct a hard-rubber case in the form of a cylinder, which is large enough to set over and form a shell for the case C. This cylindrical shell is marked A in the drawings, Figs. 2, 3, 5, and 6. The shell A has a single layer of insulated wire, E, wound around the inside thickness of hard rubber, of which it is composed, as shown. This wire coil E begins at about one-quarter of the height of A, and is wound about one-half the length of A, ending at about three-quarters of the height of A, as shown. One end of the wire of the coil E extends to the binding-post M and the other to binding-post L. I use for the coil E wire of any size, from No. 32 to No. 36, both inclusive. Some variations, however, from these sizes may be allowed. If a sheet of tin-foil be used instead of the coil E, an intense heat will be developed at the terminal points, and the conducting-wires will not be luminous. If large wire is used for the coil E, a short thick spark will pass a short distance between the terminal points, and the conducting-wires will not be luminous. Each end of the shell A is secured in a disk of wood or other suitable material, and is perforated in the center with an aperture large enough to permit the case C to pass through them.

Fig. 6 shows a sectional elevation of the case A, and Fig. 5 shows a sectional elevation of the case A and case C, with their platforms and disks in position for use.

As shown in Fig. 5, the inside of the case or shell A is considerably larger than the outside of the case C, so as to allow a vacant annular space around case C of about one inch between the two.

Fig. 9 shows the bottom of the platform or disk B, with the insulating material removed, so as to show how the connections are made. A wire, K', extends from one of the binding-posts, K, on top of platform B, thence across its bottom to the point H', Fig. 9, thence up to the binding-post, where it terminates in an adjustable air-spark terminal, H. This wire H' K' in passing the coils of hard rubber and tin-foil in the case C is made to come in contact with the inside end of the sheet of tin-foil nearest the inside of the coil, as shown in Fig. 8, where K' shows the wire going to the sheet of tin-foil, and H' shows the same wire as it is leaving the sheet of tin-foil with which it has come in contact on its way to the air-spark terminal H. (Shown in Figs. 4, 2, and 10.) Another wire extends from the binding-post J, Fig. 4, thence down through the disk or platform B to its bottom, (see J', Fig. 9,) thence to the coils in the case C, where it is made to come in contact with the outside end of the sheet of tin-foil nearest the outside of the coil, whence it passes to the point I', Fig. 9, thence up through the disk or platform B through the binding-post I, Figs. 4, 2, and 10, where it terminates in another adjustable air-spark terminal. In Fig. 8 this wire is marked J' where it is approaching the outside end of the sheet of tin-foil which lies nearest the outside of the coil, and is marked I' where it is leaving the sheet of tin-foil after coming in contact therewith. It should be noticed that the two sheets of tin-foil G G do not touch each other in the coil in the case C, nor does the wire K' H' come in contact with the same sheet of tin-foil that the wire J' I' comes in contact with. The discharge between the two sheets of tin-foil is through the air-spark terminals at H I, Figs. 2, 4, and 10.

Referring now particularly to Fig. 10, in which my invention is shown diagrammatically, I C represent an ordinary induction-coil with circuit-breaker $a$, and the primary wire of which coil is charged by a battery, $b$. The wire-terminals of the secondary coil pass to the two sheets of spirally-wound tin-foil G G, and thence to the air-spark terminals H and I, while the coil of wire surrounding the tin-foil condenser is shown at E, from which the wires W W' are led off and terminate in disks N P. If the adjustable air-spark terminals at H and I are placed in contact with each other, a continuous closed circuit from the induction-coil would be formed by means of the wires K' H' and J' I', and no effect would be produced by my accumulator. By adjusting the air-spark terminals with their points some distance apart, the electrical current is interrupted and the electricity will begin to accumulate upon the sheets of tin-foil in the case C. This accumulation of electricity upon the sheet of tin-foil will continue to increase until it is discharged by a spark passing between the air-spark terminals H I. This process will be continued, and the amount of induction upon coil E will depend on the capacity of the induction-coil, the manner in which the condenser is constructed, and the distance apart of the points of the air-spark terminals H and I. The phenomena are also varied by varying the construction of the shell A.

As shown in Fig. 1, I attach one end of a wire, W, to the binding-post L, and extend the other end of the wire to the terminal-disk N. I also attach one end of another wire, W', to the binding-post M, and extend the other end to the terminal-disk P. These wires W W' and the terminal-disks N and P are supported on the insulating-posts C', or by any other properly-insulated support. By placing the disks N and P a short distance apart, and properly adjusting the air-spark terminals H and I, and allowing the induction-coil to work in connection with my apparatus, the electrical discharges become visible along the wires and at the disks, and appear in the form of luminous lines, which appear to spring out at right angles from the wires and disks, as at E in Fig. 1. The luminous lines seem to be separated from each other at uniform distance. The distances at which the luminous lines appear to be separated from each other, and also their apparent diameters and lengths, can be varied by varying the distance and consequent rapidity of discharge between the air-spark terminals H and I. If a glass plate, $p^2$, or other dielectric be stood vertically between the disks N and P, with its faces parallel with the faces of the disks, the luminous lines from the disks N and P will be plainly seen to pass into and through the glass. The closer together the disks N and P are the less luminous will be the lines along the wires W. In Fig. 1 the radiating lines along the wire W', which connects with the terminal-disk P, are intended to represent the longer luminous lines which project around the wire when the disks N and P are set farther apart, while the corresponding radial lines around the wire W, that connects with the disk N, are intended to represent the shorter luminous lines that appear to bristle around the wires when the disks N and P are set closer together. Wherever the terminals are placed, however, when the luminous lines are produced along the wires W W', such luminous lines will be much longer along one of the wires, W', than they will be along the other wire, W.

In the construction of the condenser, Figs. 4 and 7, other dielectric substances besides hard rubber may be used. Neither is it necessary that the condenser should be rolled up in the bundle or coil. A similar effect will be produced if the condenser is left in a flat rectangular shape and the outside case, A, made of a corresponding shape. More thicknesses of tin-foil may be used together than are shown. Enough of the dielectric must be used between the layers of tin-foil in the condenser to prevent the electricity passing from one layer of tin-foil to the other as a spark. As the thicknesses of the dielectric in the condenser are increased beyond what are necessary, the luminous effect produced by the apparatus is diminished.

The sizes I have given of the layers of tin-foil and hard rubber in the condenser are the sizes which I have found suitable to use with an induction-coil capable of giving a fifteen-inch electric air-spark. These sizes may be varied to an almost unlimited extent, and should be varied as the accumulator is used with different apparatus for different experiments, as skillful electricians will readily comprehend.

Having thus fully described my invention, what I claim as new, and desire to secure by Letters Patent, is—

1. A condenser consisting of alternate layers of sheet metal and dielectric material, combined with and surrounded by an insulated coil, E, or its described equivalent, as set forth.

2. The combination, with the secondary wire of an induction-coil, of the spirally-wound sheets of alternating sheet metal and dielectric material, one of which sheets of metal is connected to an air-spark terminal and the secondary wire of the induction coil at the inner end of its convolution, and the other of which sheets of metal is connected to the other secondary wire of the induction-coil and the other air-spark terminal at the outer end of its convolution, substantially as shown and described.

3. The combination, with an induction-coil, of the condenser C, air-spark terminals H I, and disconnected coil E, as and for the purpose described.

4. The cylindrical case A, having coil E, insulated between sheets of rubber, combined with and adapted to fit over a condenser, C, as shown and described.

JAMES DARIUS CULP.

Witnesses:
 EDW. W. BYRN,
 AMOS W. HART.